United States Patent
Tzikas et al.

Patent Number: 5,149,791
Date of Patent: Sep. 22, 1992

[54] CHLOROTRIAZINE REACTIVE DYES HAVING A 4-METHOXY-2-SULFOANILINE DIAZO COMPONENT AND 2-AMINO-5-NAPHTHOL-7-SULFONIC ACID COUPLING COMPONENT

[75] Inventors: Athanassios Tzikas, Pratteln; Urs Lauk, Zürich, both of Switzerland

[73] Assignee: Ciba-Geigy Corporation, Ardsley, N.Y.

[21] Appl. No.: 604,552

[22] Filed: Oct. 26, 1990

[30] Foreign Application Priority Data

Nov. 1, 1989 [CH] Switzerland .................. 3941/89

[51] Int. Cl.$^5$ ............... C09B 62/085; C09B 67/26; D06P 1/382
[52] U.S. Cl. ................ 534/638; 534/632; 8/524; 8/527; 8/528
[58] Field of Search ................ 534/632, 638

[56] References Cited

U.S. PATENT DOCUMENTS

| | | | |
|---|---|---|---|
| 2,873,269 | 2/1959 | Fasciati | 534/632 |
| 4,284,554 | 8/1981 | Doswald | 534/632 |
| 4,518,391 | 5/1985 | Auerbach | 8/549 |
| 4,808,706 | 2/1989 | Seiler | 534/638 |

FOREIGN PATENT DOCUMENTS

| | | |
|---|---|---|
| 1327016 | 4/1963 | France . |
| 50-94028 | 7/1975 | Japan . |
| 62-199656 | 9/1987 | Japan . |
| 0636895 | 6/1983 | Switzerland . |
| 0639121 | 10/1983 | Switzerland . |
| 2029853 | 3/1980 | United Kingdom . |
| 2030168 | 4/1980 | United Kingdom . |
| 2030591 | 4/1990 | United Kingdom . |

OTHER PUBLICATIONS

Chem. Abstract, vol. 83, 207560s (1975) Sueda et al.
Chem. Abstract, vol. 108, 39639p (1988) Shirasaki et al.

*Primary Examiner*—Mary C. Lee
*Assistant Examiner*—Fiona T. Powers
*Attorney, Agent, or Firm*—Marla J. Mathias; Edward McC. Roberts

[57] ABSTRACT

Novel reactive dyes of the formula

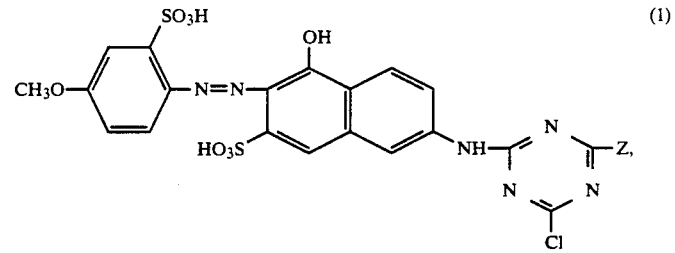

in which Z is a radical of the formula

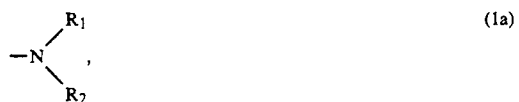

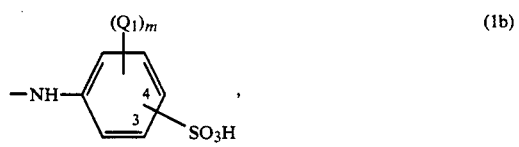

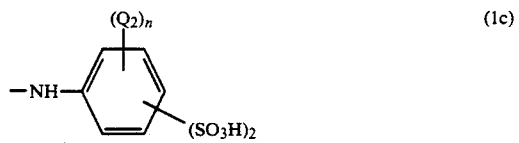

or

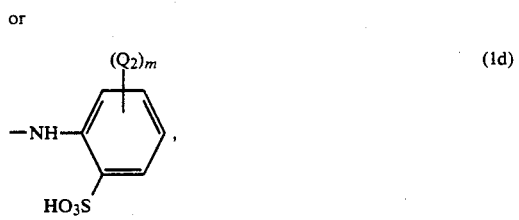

in which $R_1$ and $R_2$ independently of one another are hydrogen or $C_1$-$C_6$alkyl, which can be substituted by $C_1$-$C_4$alkoxy, hydroxy-$C_1$-$C_4$alkoxy, HO—($CH_2CH_2$—O)$_{2-4}$—, $C_1$-$C_4$alkoxy-carbonyl, $C_2$-$C_4$alkanoyloxy, carboxyl, cyano, chlorine, sulfo or sulfato, n is the number 0, 1 or 2 and m is the number 1 or 2, $(Q_1)_m$ is 1 or 2 substituents $Q_1$ independent of one another from the group comprising $C_1$-$C_4$alkyl, $C_1$-$C_4$alkoxy, acetylamino and carboxyl, $(Q_2)_n$ is 0 to 2 substituents $Q_2$ and $(Q_2)_m$ is 1 or 2 substituents $Q_2$ independent of one another from the group comprising $C_1$-$C_4$alkyl, $C_1$-$C_4$alkoxy, acetylamino, halogen and carboxyl, and the sulfo group in the radical of the formula (1b) is bonded to the benzene ring in the 3- or 4-position, give deep scarlet red dyeings and prints with good fastness properties on cellulose fibres.

7 Claims, No Drawings

CHLOROTRIAZINE REACTIVE DYES HAVING A 4-METHOXY-2-SULFOANILINE DIAZO COMPONENT AND 2-AMINO-5-NAPHTHOL-7-SULFONIC ACID COUPLING COMPONENT

Reactive dyes are widely used for dyeing and printing textile fibre materials. Although a large number of useful reactive dyes with various properties and for various fields of use are now available, the technical status achieved in many cases is not yet completely satisfactory in view of the high requirements in respect of the suitability for certain dyeing processes and the fastness level of the dyeings.

The object of the present invention is to discover novel reactive dyes which are suitable for dyeing and printing processes, have a high degree of fixing and at the same time leave non-fixed portions which can easily be washed out; the dyes should furthermore have generally good fastness properties and in particular a colour shade in the red region. It has been found that the novel dyes defines below largely achieve the object set.

The invention thus relates to reactive dyes of the formula

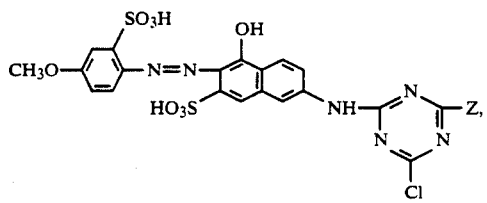

in which Z is a radical of the formula

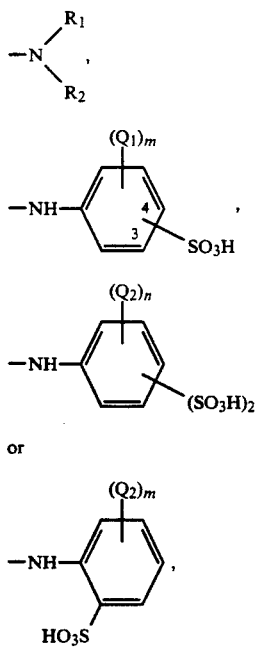

in which $R_1$ and $R_2$ independently of one another are hydrogen or $C_1-C_6$alkyl, which can be substituted by $C_1-C_4$alkoxy, hydroxy-$C_1-C_4$alkoxy, HO—(CH$_2$CH$_2$—O)$_{2-4}$—, $C_1-C_4$alkoxy-carbonyl, $C_2-C_4$alkanoyloxy, carboxyl, cyano, chlorine, sulfo or sulfato, n is the number 0, 1 or 2 and m is the number 1 or 2, (Q$_1$)$_m$ is 1 or 2 substituents Q$_1$ independent of one another from the group comprising $C_1-C_4$alkyl, $C_1-C_4$alkoxy, acetylamino and carboxyl, (Q$_2$)$_n$ is 0 to 2 substituents Q$_2$ and (Q$_2$)$_m$ is 1 or 2 substituents Q$_2$ independent of one another from the group comprising $C_1-C_4$alkyl, $C_1-C_4$alkoxy, acetylamino, halogen and carboxyl, and the sulfo group in the radical of the formula (1b) is bonded to the benzene ring in the 3- or 4-position.

$C_1-C_6$Alkyl $R_1$ and $R_2$ is, for example, methyl, ethyl, isopropyl, n-propyl, n-butyl, sec-butyl, isobutyl, tert-butyl, n-pentyl or n-hexyl, it being possible for the radicals mentioned to be substituted as defined, and $C_1-C_4$alkoxy being, for example, methoxy, ethoxy, isopropoxy, n-propoxy or n-butoxy; hydroxy-$C_1-C_4$alkoxy being, for example, β-hydroxyethoxy, β-hydroxypropoxy or γ-hydroxypropoxy; $C_1-C_4$alkoxycarbonyl being, for example, methoxycarbonyl or ethoxycarbonyl; $C_2-C_4$alkanoyloxy being, for example, acetoxy or propionyloxy; and HO—(CH$_2$CH$_2$—O)$_{2-4}$—being, for example, HO—(CH$_2$CH$_2$—O)$_2$—, HO—(CH$_2$CH$_2$—O)$_3$—or HO—(CH$_2$CH$_2$—O)$_4$—.

$C_1-C_4$Alkyl $Q_1$ or $Q_2$ is methyl, ethyl, isopropyl, n-propyl, sec-butyl, isobutyl, tert-butyl or n-butyl.

$C_1-C_4$Alkoxy $Q_1$ or $Q_2$ is methoxy, ethoxy, isopropoxy, n-propoxy, sec-butoxy, isobutoxy, tert-butoxy or n-butoxy.

Halogen $Q_2$ is, for example, fluorine, bromine or in particular chlorine.

Reactive dyes of the formula (1) in which Z is a radical of the formula (1a) and $R_1$ and $R_2$ independently of one another are hydrogen or $C_1-C_4$alkyl, which can be substituted by $C_1-C_4$alkoxy, hydroxy-$C_2-C_4$alkoxy, sulfo or sulfato, are preferred.

Reactive dyes of the formula (1) in which Z is a radical of the formula (1b), m is the number 1 and $Q_1$ is methyl, methoxy, acetylamino or carboxyl are likewise preferred.

Reactive dyes of the formula (1) in which Z is a radical of the formula (1c), n is the number 0 or 1 $Q_2$ is methyl, methoxy, acetylamino, chlorine or carboxyl are furthermore preferred.

Reactive dyes of the formula (1) in which Z is a radical of the formula (1d), m is the number 1 or 2 and $Q_2$ is methyl, methoxy, acetylamino, chlorine or carboxyl are furthermore preferred.

Reactive dyes of the formula (1) in which Z is β-sulfoethylamino, N-methyl-β-sulfoethylamino, β-(β'-hydroxyethoxy)ethylamino, N-methyl-β-(β'-hydroxyethoxy)ethylamino, β-sulfatoethylamino, N-methyl-β-sulfatoethylamino, —NH$_2$, methylamino, ethylamino, N,N-dimethylamino, N,N-diethylamino, n-propylamino, isopropylamino, n-butylamino, 2,4-disulfoanilino, 2,5-disulfoanilino, 2-methoxy-4-sulfoanilino, 2-methyl-5-sulfoanilino, 2-sulfo-5-chloroanilino, 3-sulfo-4-methoxyanilino, 2-methyl-4-sulfoanilino, 3-sulfo-4-methylanilino or 2,4-dimethyl-6-sulfoanilino are particularly preferred.

Reactive dyes of the formula (1) in which Z is a radical of the formula —NHCH$_2$CH$_2$SO$_3$H or —N(CH$_3$)CH$_2$CH$_2$SO$_3$H are especially preferred.

Reactive dyes of the formula (1) in which Z is a radical of the formula

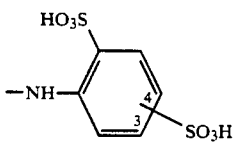

and the sulfo group is bonded to the benzene ring in the 3-or 4-position are furthermore especially preferred.

The dyes of the formula (1) are fibre-reactive since they contain, in the s-triazine radical, a chlorine atom which can be split off.

Fibre-reactive compounds are to be understood as meaning those which are capable of reacting with the hydroxyl groups of çellulose or with the amino groups of naturally occurring or synthetic polyamides to form covalent chemical bonds.

The preparation of the reactive dyes of the formula (1) comprises reacting a diazotized diazo component of the formula

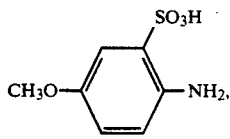

a coupling component of the formula

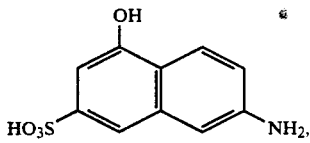

(or the corresponding N-acetylamino compound, which is hydrolysed after the coupling), 2,4,6-trichloro-s-triazine and an amine of the formula $$H-Z \qquad (4),$$

in which Z is as defined under formula (1), in any order by coupling and condensation to give a reactive dye of the formula (1).

Since the individual process steps defined above can be performed in a varying order and if appropriate in some cases also simultaneously various process variants are possible. The starting substances to be used for each part reaction can be seen from formula (1). The reaction is in general carried out stepwise in succession, it being possible for the order of the simple reactions between the individual reaction components to be chosen as required.

Important embodiments of the process according to the invention comprise 1) coupling a diazotized amino compound of the formula (2) with a coupling component of the formula (3) (or the corresponding N-acetylamino compound) to give an azo compound, if appropriate splitting off the N-acetyl group by hydrolysis, subjecting the azo compound to condensation with 2,4,6-trichloro-s-triazine and subjecting the resulting primary condensation product to condensation with an amino compound of the formula (4) to give a reactive dye of the formula (1);

2) coupling a diazotized amino compound of the formula (2) with a coupling component of the formula (3) (or the corresponding N-acetylamino compound) to give an azo compound and if appropriate splitting off the N-acetyl group by hydrolysis, and furthermore subjecting 2,4,6-trichloro-s-triazine to condensation with an amino compound of the formula (4) and subjecting the resulting primary condensation product to condensation with the abovementioned azo compound to give a reactive dye of the formula (1);

3) subjecting a coupling component of the formula (3) to condensation with 2,4,6-trichloro-s-triazine, subjecting the resulting primary condensation product to condensation with an amino compound of the formula (4) and coupling the resulting secondary condensation product with a diazotized amino compound of the formula (2) to give a reactive dye of the formula (1);

4) subjecting a coupling component of the formula (3) to condensation with 2,4,6-trichloro-s-triazine, coupling a diazotized amino compound of the formula (2) to the resulting primary condensation product and subjecting the resulting azo compound to condensation with an amino compound of the formula (4) to give a reactive dye of the formula (1); and 5) subjecting 2,4,6-trichloro-s-triazine to condensation with an amino compound of the formula (4), subjecting the resulting primary condensation product to condensation with a coupling component of the formula (3) and coupling a diazotized amino compound of the formula (2) to the resulting secondary condensation product, so that a reactive dye of the formula (1) is obtained.

Starting substances which can be used for the preparation of the reactive dyes of the formula (1) are;

Amino compound of the formula (2), diazocomponent 4-methoxy-2-sulfoaniline.

Coupling component of the formula (3) 2-amino-5-hydroxynaphthalene-7-sulfonic acid 2,4,6-Trichloro-s-triazine Amines of the formula (4)

β-Sulfoethylamine, N-methyl-β-sulfoethylamine, β-(β'-hydroxyethoxy)ethylamine, N-methyl-β-(β'-hydroxyethoxy)ethylamine, β-sulfatoethylamine, N-methyl-β-sulfatoethylamine, ammonia, methylamine, ethylamine, N,N-dimethylamine, N,N-diethylamine, n-propylamine, isopropylamine, n-butylamine, 2,4-disulfoaniline, 2,5-disulfoaniline, 2-methoxy-4-sulfoaniline, 2-methyl-5-sulfoaniline, 2-sulfo-5-chloroaniline, 3-sulfo-4-methoxyaniline, 2-methyl-4-sulfoaniline, 3-sulfo-4-methylaniline or 2,4-dimethyl-6-sulfoaniline.

The diazo components are as a rule diazotized by the action of nitrous acid in aqueous-mineral acid solution at a low temperature, and coupling to the coupling component is carried out at weakly acid, neutral to weakly alkaline pH values.

The condensation reactions between the 2,4,6-trichloro-s-triazine and the aminomonoazo compounds and the amino compounds of the formula (4) are preferably carried out in aqueous solution or suspension, at a low temperature and at a weakly acid, neutral to weakly alkaline pH, so that one chlorine atom still remains as a radical which can be split off in the finished reactive dye of the formula (1). The hydrogen chloride liberated during the condensation is advantageously neutralized continuously by addition of aqueous alkali metal hydroxides, carbonates or bicarbonates. Isolation of the dichlorotriazine-azo compound is in general omitted.

The reactive dyes of the formula (1) can be isolated and processed to useful dry dyeing preparations. The isolation is preferably carried out at the lowest possible temperatures by salting out and filtration. The filtered dyes can be dried, if appropriate after addition of extenders and/or buffers, for example after addition of a mixture of equal parts of mono- and disodium phosphate; the drying is preferably carried out at temperatures which are not too high and under reduced pressure. In certain cases, the dry preparations according to the invention can be prepared directly, i.e. without intermediate isolation of the dyes, by spray drying the entire preparation mixture.

The invention furthermore relates to storage-stable, concentrated, liquid dye preparations of the reactive dyes of the formula (1) and to their use for the preparation of padding liquors, dyebaths and in particular printing pastes, which are used for dyeing and printing fibre materials, in particular cellulose-containing fibre materials.

Liquid dye preparations have advantages over the powder form, for example no dust formation during preparation of printing pastes and of padding and dye liquors, no wetting problems due to formation of lumps and no mottled dyeings due to undissolved dye particles. Such liquid formulations should be highly concentrated (dye content of at least 10% by weight, and preferably more than 15% by weight) and it should be possible to store them in unchanged form at least for several months in a wide temperature range ($-10°$ to $+40°$ C.).

The aqueous solution or suspension, containing solvent if appropriate, obtained directly from the synthesis or an aqueous suspension of the moist press or filter cake of the crude dyes of varying content of undesirable dissolved substances having a low molecular weight, in particular of by-products obtained in the synthesis of the dye and dissolved inorganic and organic salts, can be used as the starting solution or suspension for the preparation of the dye preparations. In cases where the condensation product can be salted out only with extreme effort, if at all, the crude condensation or neutralization solution can also be used directly. Starting solutions or suspensions which contain 2 to 50% of dye are advantageously used.

However, the dry crude dye powder can also be used as the starting substance if this is first suspended in water.

The concentrated liquid preparations according to the invention are as a rule true or colloidal solutions. They are mobile (viscosity of about 5 to 300 cP/20° C.) and have a good storage stability, i.e. they remain in the usable state for at least several months at temperatures of $-20°$ to $+60°$ C., in particular $-10°$ to $+40°$ C. Both water and organic solvents and/or thickeners can be added to these preparations during preparation of padding liquors, dyebaths and printing pastes without the dye precipitating or other inhomogeneities occurring. Using the padding liquors, dyebaths and printing pastes mentioned, it is possible to dye or print, for example, textile materials of naturally occurring or synthetic fibre materials, in particular cellulose-containing fibre materials, in a known manner.

The liquid dye preparations preferably contain 20 to 50% by weight, in particular 35 to 45% by weight, of the dye of the formula (1).

The stable concentrated liquid dye preparations according to the invention are particularly suitable for the preparation of printing pastes for printing cellulose fibre materials and for continuous dyeing processes.

One process for the preparation of a liquid preparation according to the invention is known, for example, from EP-A-0,333,656, in which the dye solution is desalinated and concentrated in a reverse osmosis unit.

The use of membrane-associated filtering techniques for the preparation of formulations of water-soluble organic dyes is known. The process starts from the aqueous suspensions of the crude dye, which are largely freed from water-soluble by-products and in which the salt content is reduced to about half with the aid of a first membrane separation process; this is then followed by a second membrane separation process.

In this first membrane separation process, the soluble by-products and some of the salts thus permeate through a membrane, whereas the dye and water-insoluble contents are retained.

In the second membrane separation process the dye suspension—if appropriate after dilution with water—is then desalinated and concentrated, and and finally converted into a liquid or solid dye formulation which is ready for sale.

The dye solutions employed according to the invention as a rule have a dye content of 5 to 20% by weight and a salt content (inorganic salts) of 1 to 20% by weight, in particular 1 to 10% by weight. The pH as a rule lies in the range from 3 to 10, preferably 3 to 9. Insoluble contents are separated off by microfiltration, and the concentration and desalination is performed until a dye content of 10 to 50% by weight is reached. During this operation, the salt content drops to below 5% by weight, for example 0.05 to 5% by weight, and preferably below 1% by weight, for example 0.05 to 1% by weight.

To prepare a liquid form which is ready for sale, the concentrated aqueous dye formulation is brought to a given final dye content merely by dilution and/or with the aid of extenders, if appropriate after addition of the components customary for liquid formulations, such as solubilizing agents, foam suppressants, antifreeze agents, humectants, surfactants, buffer substances and/or antimicrobial agents, and adjusting the pH. However, the dye formulation can also be converted into a solid dye preparation by dehydration, if appropriate after addition of additives, such as binders, dust removal agents, wetting agents, buffer substances, such as alkali metal polyphosphates, disodium hydrogen phosphate, citric acid and/or ethylenediaminetetraacetic acid, and/or extenders. Because of the increased dye concentration, less energy is required for drying. The customary drying processes, in particular spray drying, are used.

The pH of the liquid formulation of the reactive dyes which is ready for sale is as a rule adjusted by addition of buffer substances. The pH is, for example, in the range from 7.0 to 8.5, preferably 8.0.

The dyeing assistants or additives mentioned can of course not only be added to the dye solution before final formulation thereof as the commercial form, but also introduced into the solution of the crude dye even before or during the process according to the invention, and are thus at least in part already present in the dye solution from which the final dye formulation ready for sale is prepared (for example solubilizing agents, solvents, surfactants and the like). Addition during the process is of course only appropriate if the dyeing assistant or assistants or additive or additives are not removed again completely from the solution by one of the membrane separation processes.

The concentrated liquid preparations, according to the invention, of the reactive dyes of the formula (1) thus contain 10 to 50% by weight of dye, 0.05 to 5% by weight of an inorganic salt, for example NaCl, KCl or LiCl, buffer substances, for example mono- and disodium phosphate or sodium tripolyphosphate, or mixtures of buffer substances in an amount such that a pH of between 7.0 and 8.5 can be established, and water.

The reactive dyes of the formula (1) are distinguished by a high reactivity and they produce dyeings having good wet and light fastness properties. It is particularly emphasized that the dyes have a good solubility and high dye fixing, that they diffuse well into the cellulose fibre and that the non-fixed portions can easily be removed.

The dyes of formula (1) are obtained in the form of the free sulfonic acid or, preferably, of the salts thereof. Examples of suitable salts are the alkali metal salts, alkaline earth metal salts or ammonium salts, or the salts of an organic amine. Typical examples are the sodium, lithium, potassium or ammonium salts or the triethanolamine salt.

The reactive dyes of the formula (1) are suitable for dyeing and printing widely varying materials, such as silk, leather, wool, polyamide fibres and polyurethanes, but in particular cellulose-containing materials of a fibrous structure, such as linen, cellulose, regenerated cellulose and in particular cotton. They are suitable both for the exhaustion process and for dyeing by the pad-dyeing process, in which the goods are impregnated with aqueous dye solutions, which may also contain salts, and the dyes are fixed after an alkaline treatment or in the presence of alkali, if appropriate under the action of heat.

They are suitable above all for printing textile cellulose-containing fibre materials, in particular cotton, but also likewise for printing nitrogen-containing fibres, for example wool, silk or blended fabrics containing wool. They are particularly suitable for gentle printing processes, for example using sodium propionate as the fixing alkali.

It is advisable to subject the dyeings and prints to thorough rinsing with cold and hot water, if appropriate with the addition of a dispersing agent which promotes diffusion of the non-fixed portions.

When used in practice, the dyes according to the invention are advantageously employed in the form of liquid dyeing or printing formulations.

The preparation of the monoazo intermediates is not described in all instances in the following examples, but can be seen without problems from the above comments.

In the following examples the parts are by weight. The temperatures are degrees Celcius. Parts by weight and parts by volume bear the same relationship to one another as the gram to cubic centimetre.

EXAMPLE 1

45.3 parts of the aminoazo dye of the formula

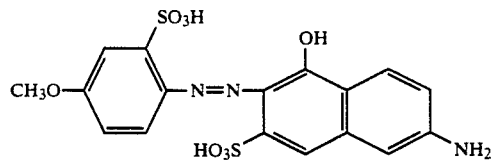

in the form of the disodium salt are dissolved in 500 parts of water and the solution is cooled to 5° by addition of ice. A solution of 18.5 parts of cyanuric chloride in 60 parts of acetone is added, the pH of the reaction mixture being kept at 6 to 7 by gradual addition of a dilute sodium hydroxide solution. When the condensation has ended, 12.5 parts of taurine are added. A pH of 6 to 7 is maintained while continuously buffering the hydrochloric acid liberated and increasing the temperature to 30°. When the reaction has ended, the reactive dye formed is salted out, filtered off and dried. It dissolves in water giving a scarlet red colour and dyes cellulose fibres in scarlet shades of good wet and light fastness properties by the exhaustion process.

The dye has the formula

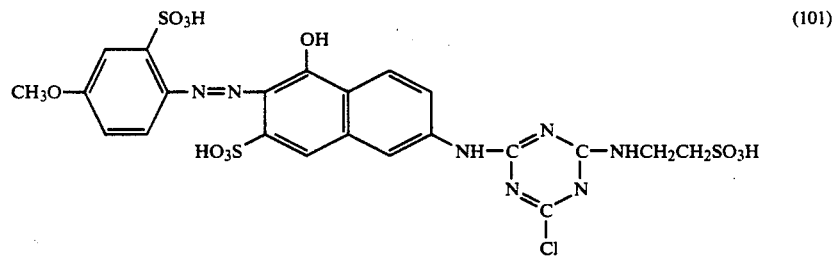

(101)

Other dyes which dye cellulose fibres in scarlet red shades are obtained by the process described if equivalent amounts of the amines listed below are used instead of taurine.

| Example No. | Amine | Colour shade |
|---|---|---|
| 2 | N-Methyltaurine | |
| 3 | Ethanolamine | |
| 4 | 4-Methyl-2,5-disulfoaniline | |
| 5 | $H_2N-(CH_2CH_2-O)_2-CH_2CH_2-OH$ | |
| 6 | β-(β'-Hydroxyethoxy)ethylamine | |
| 7 | N-Methyl-β-(β'-hydroxyethoxy)ethylamine | |
| 8 | β-Sulfatoethylamine | |
| 9 | N-Methyl-β-sulfatoethylamine | |
| 10 | Ammonia | |
| 11 | Methylamine | |
| 12 | Ethylamine | |
| 13 | N,N-Dimethylamine | |
| 14 | N,N-Diethylamine | |
| 15 | n-Propylamine | |
| 16 | Isopropylamine | |
| 17 | n-Butylamine | |
| 18 | $H_2N-(CH_2CH_2-O)_3-CH_2CH_2-OH$ | |
| 19 | $H_2N-(CH_2CH_2-O)_4-CH_2CH_2-OH$ | |
| 20 | Aniline-2,4-disulfonic acid | |
| 21 | Aniline-2,5-disulfonic acid | |
| 22 | 2-Methoxy-4-sulfoaniline | |
| 23 | 2-Methyl-5-sulfoaniline | |
| 24 | 2-Sulfo-5-chloroaniline | |
| 25 | 3-Sulfo-4-methoxyaniline | |
| 26 | 2-Methyl-4-sulfoaniline | |
| 27 | 3-Sulfo-4-methylaniline | |
| 28 | 2,4-Dimethyl-6-sulfoaniline | |

Dyeing Instructions 1

2 parts of the dye obtained according to Example 1 are dissolved in 100 parts of water at 20° to 50° C., with the addition of 5 to 20 parts of urea and 2 parts of anhydrous $Na_2CO_3$. A cotton fabric is impregnated with the resulting solution so that it increases by 60 to 80% of its weight, and is then dried. Thereafter, it is subjected to thermofixing at 140° to 210° C. for 1½ to 5 minutes and then soaped in a 0.1% solution of an ion-free detergent at the boiling point for quarter of an hour, rinsed and dried.

Dyeing Instructions 2

2 parts of the dye obtained according to Example 1 are dissolved in 2000 parts of water at 75° C. with the addition of 120 parts of NaCl or anhydrous $Na_2SO_4$. 100 parts of a cotton fabric are introduced into this dyebath and the temperature is kept constant for 30 to 60 minutes. Thereafter, 10 parts of anhydrous $Na_2CO_3$ and 4 ml of sodium hydroxide solution (30%) are added. The temperature is kept at 75° to 80° C. for a further 45 to 60 minutes and the fabric is then soaped in a 0.1% solution of an ion-free detergent at the boiling point for 15 minutes, rinsed and dried.

Dyeing Instructions 3

2 parts of the dye obtained according to Example 1 are dissolved in 100 parts of water, with the addition of 0.5 part of sodium m-nitrobenzenesulfonate. A cotton fabric is impregnated with the resulting solution so that it increases by 75% of its weight and is then dried. Thereafter, the fabric is impregnated with a warm solution, at 20° C., containing 5 g of sodium hydroxide and 300 g of sodium chloride per liter and squeezed off to a weight increase of 75%, the dyeing is steamed at 100° to 101° C. for 30 seconds and the fabric is rinsed, soaped in a 0.3% solution of an ion-free detergent at the boiling point for quarter of an hour, rinsed and dried.

Dyeing Instructions 4

2 parts of the dye obtained according to Example 1 are dissolved in 100 parts of water. The solution is added to 1900 parts of cold water, 60 parts of sodium chloride are added and 100 parts of a cotton fabric are introduced into this dyebath. The temperature is increased to 60° C., 40 parts of anhydrous $Na_2CO_3$ and a further 60 parts of sodium chloride being added after 30 minutes. The temperature is maintained at 60° C. for 30 minutes, the fabric is rinsed and the dyeing is then soaped in a 0.3% solution of an ion-free detergent at the boiling point for 15 minutes, and the fabric is rinsed and dried.

Printing Instructions 1

2 parts of the dye prepared according to Example 1 are sprinkled, with rapid stirring, into 100 parts of a stock thickener containing 45 parts of 5% sodium alginate thickener, 32 parts of water, 20 parts of urea, 1 part of sodium m-nitrobenzenesulfonate and 2 parts of sodium carbonate. A cotton fabric is printed with the resulting printing paste on a roller printing machine and the resulting printed material is steamed at 100° C. in saturated steam for 4 to 8 minutes. The printed fabric is then rinsed thoroughly in cold and hot water, during which the portions which are not chemically fixed can be removed very easily from the fibre, and is then dried.

Printing Instructions 2

6 parts of the reactive dye of the formula (101) from Example 1 are sprinkled, with rapid stirring, into 94 parts of a stock thickener containing 50 parts of 5% sodium alginate thickener, 39.4 parts of water, 3.5 parts of sodium propionate, 1 part of sodium m-nitrobenzenesulfonate and 0.1 part of 40% aqueous formaldehyde solution. A mercerized cotton fabric is printed with the printing paste thus obtained and dried and the resulting printed material is steamed at 103° C. in saturated steam for 8 minutes. The printed fabric is then rinsed and subsequently dried. A red print is obtained.

What is claimed is:

1. A reactive dye of the formula

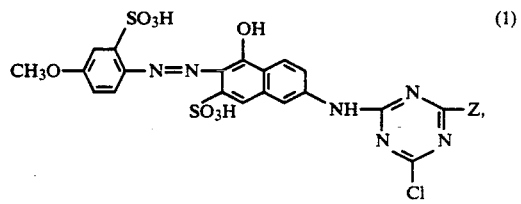

in which Z is a radical of the formula

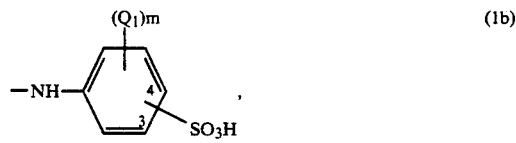

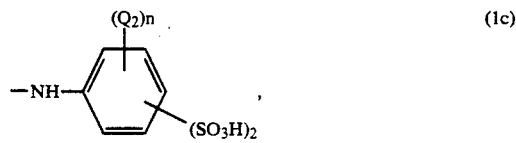

or

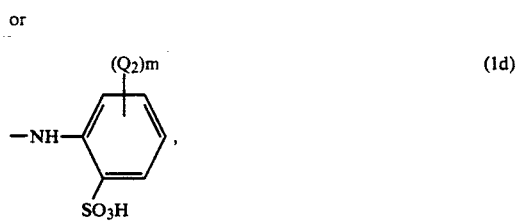

in which n is the number 0, 1 or 2 and m is the number 1 or 2, $(Q_1)_m$ is 1 or 2 substituents $Q_1$ independent of one another from the group comprising $C_1$-$C_4$alkyl, $C_1$-$C_4$alkoxy, acetylamino and carboxyl, $(Q_2)_n$ is 0 to 2 substituents $Q_2$ and $(Q_2)_m$ is 1 or 2 substituents $Q_2$ independent of one another from the group comprising $C_1$-$C_4$alkyl, $C_1$-$C_4$alkoxy, acetylamino, halogen and carboxyl, and the sulfo group in the radical of the formula (1b) is bonded to the benzene ring in the 3- or 4-position.

2. A reactive dye according to claim 1, in which Z is a radical of the formula (1b), m is the number 1 and $Q_1$ is methyl, methoxy, acetylamino or carboxyl.

3. A reactive dye according to claim 2, in which Z is 2-methoxy-4-sulfoanilino, 2-methyl-5-sulfoanilino, 3-sulfo-4-methoxyanilino, 2-methyl-4-sulfoanilino and 3-sulfo-4-methylanilino.

4. A reactive dye according to claim 1, in which Z is a radical of the formula (1c), n is the number 0 or 1 and $Q_2$ is methyl, methoxy, acetylamino, chlorine or carboxyl.

5. A reactive dye according to claim 4, in which Z is a radical of the formula

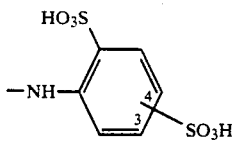

and the sulfo group is bonded to the benzene ring in the 3-or 4-position.

6. A reactive dye according to claim 1, in which Z is a radical of the formula (1d), m is the number 1 or 2 and $Q_2$ is methyl, methoxy, acetylamino, chlorine or carboxyl.

7. A reactive dye according to claim 6, in which Z is 2sulfo-5-chloroanilino or 2,4-dimethyl-6-sulforanilino.

* * * * *